(12) United States Patent
Takeuchi (10) Patent No.: US 9,883,096 B2
(45) Date of Patent: Jan. 30, 2018

(54) FOCUS DETECTION APPARATUS AND CONTROL METHOD THEREOF

(71) Applicant: CANON KABUSHIKI KAISHA, Tokyo (JP)

(72) Inventor: Kengo Takeuchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/089,755

(22) Filed: Apr. 4, 2016

(65) Prior Publication Data

US 2016/0301853 A1 Oct. 13, 2016

(30) Foreign Application Priority Data

Apr. 9, 2015 (JP) ................. 2015-080350

(51) Int. Cl.
*H04N 5/232* (2006.01)
*H04N 5/345* (2011.01)

(52) U.S. Cl.
CPC ......... *H04N 5/23212* (2013.01); *H04N 5/345* (2013.01)

(58) Field of Classification Search
CPC .............................................. H04N 5/23212
See application file for complete search history.

(56) References Cited

U.S. PATENT DOCUMENTS

| 4,410,804 | A | 10/1983 | Stauffer | |
|---|---|---|---|---|
| 9,048,152 | B2 | 6/2015 | Kishi | |
| 2015/0009383 | A1* | 1/2015 | Fujii | H04N 5/347 348/302 |
| 2015/0222811 | A1 | 8/2015 | Kishi | |
| 2015/0256778 | A1* | 9/2015 | Kusaka | G03B 13/36 348/302 |

FOREIGN PATENT DOCUMENTS

| JP | S58-024105 A | 2/1983 |
|---|---|---|
| JP | 2005-106994 A | 4/2005 |
| JP | 2013-072906 A | 4/2013 |
| WO | WO 2014050875 | * 4/2014 |

* cited by examiner

*Primary Examiner* — Padma Haliyur
(74) *Attorney, Agent, or Firm* — Fitzpatrick, Cella, Harper & Scinto (57) ABSTRACT

A focus detection apparatus comprises an image capturing unit including a plurality of pixels for detecting a pair of image signals of an object, a setting unit which sets, in the image capturing unit, focus detection areas in which pixel lines including a plurality of pixels aligned in a first direction are arranged in a second direction perpendicular to the first direction, a signal generation unit which generates the pair of image signals from outputs of the pixel lines of the focus detection areas, and a focus detection unit which determines an amount of defocus of an imaging optical system by using the pair of image signals. The setting unit is configured to arrange the pixel lines such that the pixel lines are out of phase between adjacent focus detection areas.

12 Claims, 10 Drawing Sheets

FOCUS DETECTION APPARATUS AND CONTROL METHOD THEREOF

BACKGROUND OF THE INVENTION

Field of the Invention

The present invention relates to a phase-difference detection type focus detection technique.

Description of the Related Art

Japanese Patent Laid-Open Nos. 58-024105 and 2005-106994 disclose techniques for performing focus detection based on image signals obtained by an image capturing unit including pixels, each being pupil divided by a microlens. According to Japanese Patent Laid-Open No. 58-024105, each pupil-divided pixel receives light beams that have passed through different pupil regions of an image forming optical system via the microlens. Also, according to Japanese Patent Laid-Open No. 2005-106994, some of the pixels constituting an image capturing unit include a photoelectric conversion unit divided into two so as to detect a focus state of a lens, and the photoelectric conversion unit receives, via a microlens, light beams that have passed through different pupil regions of the lens.

Japanese Patent Laid-Open No. 2013-072906 discloses a technique in which in phase-difference detection type focus detection, for the purpose of improving the SN ratio, correlation values of a plurality of distance measurement lines are obtained, and the amount of offset between two images is obtained after the correlation values of the plurality of distance measurement lines are added.

In the phase-difference detection type focus detection described above (hereinafter, referred to as "phase difference AF"), determining how much amount of pixel data needs to be read out for calculation processing to perform focus detection is a very important factor in terms of detection accuracy and the speed of processing. In addition, if all pixel data is input, with the image capturing unit including pixels each being divided into two, the amount of data is twice that of captured image, and thus a significantly large load is placed on a processing circuit in a subsequent stage.

For example, measures are required to be taken such as implementing parallel processing and increasing the clock frequency, which generates heat and further requires a thermal solution to be implemented in the mechanism, making it difficult to achieve cost reduction. Accordingly, there is a need for, for example, pixel data for focus detection to be thinned according to a desired detection accuracy, whereas pixel data for an image is generated by adding the data of a pixel divided into two.

SUMMARY OF THE INVENTION

The present invention has been made in consideration of the aforementioned problems, and realizes a focus detection technique with which a processing load can be reduced while a desired object capturing rate and a desired focus detection accuracy are achieved.

In order to solve the aforementioned problems, the present invention provides a focus detection apparatus comprising: an image capturing unit including a plurality of pixels for detecting a pair of image signals of an object from light beams that have passed through different pupil regions of an image forming optical system; a setting unit configured to set, in the image capturing unit, focus detection areas in which pixel lines including a plurality of pixels aligned in a first direction are arranged in a second direction perpendicular to the first direction; a signal generation unit configured to generate the pair of image signals from outputs of the pixel lines of the focus detection areas; and a focus detection unit configured to determine an amount of defocus of an imaging optical system by using the pair of image signals generated by the signal generation unit, wherein the setting unit is configured to arrange the pixel lines such that the pixel lines are out of phase between adjacent focus detection areas.

In order to solve the aforementioned problems, the present invention provides a control method of a focus detection apparatus which has an image capturing unit including a plurality of pixels for detecting a pair of image signals of an object from light beams that have passed through different pupil regions of an image forming optical system and performs focus detection by using the image capturing unit, the method comprising: setting, in the image capturing unit, focus detection areas in which pixel lines including a plurality of pixels aligned in a first direction are arranged in a second direction perpendicular to the first direction; generating the pair of image signals from outputs of the pixel lines of the focus detection areas; and determining an amount of defocus of an imaging optical system by using the pair of image signals generated, wherein in the setting of the focus detection areas, the pixel lines are arranged such that the pixel lines are out of phase between adjacent focus detection areas.

In order to solve the aforementioned problems, the present invention provides an image capturing apparatus comprising: a control unit configured to perform control based on an amount of defocus of a lens unit such that the lens unit is in focus, wherein the control unit includes units of a focus detection apparatus, the focus detection apparatus comprising: an image capturing unit including a plurality of pixels for detecting a pair of image signals of an object from light beams that have passed through different pupil regions of an image forming optical system; a setting unit configured to set, in the image capturing unit, focus detection areas in which pixel lines including a plurality of pixels aligned in a first direction are arranged in a second direction perpendicular to the first direction; a signal generation unit configured to generate the pair of image signals from outputs of the pixel lines of the focus detection areas; and a focus detection unit configured to determine an amount of defocus of an imaging optical system by using the pair of image signals generated by the signal generation unit, wherein the setting unit is configured to arrange the pixel lines such that the pixel lines are out of phase between adjacent focus detection areas.

In order to solve the aforementioned problems, the present invention provides a non-transitory computer-readable storage medium storing a program for causing a computer to function as each unit of a focus detection apparatus, the focus detection apparatus comprising: an image capturing unit including a plurality of pixels for detecting a pair of image signals of an object from light beams that have passed through different pupil regions of an image forming optical system; a setting unit configured to set, in the image capturing unit, focus detection areas in which pixel lines including a plurality of pixels aligned in a first direction are arranged in a second direction perpendicular to the first direction; a signal generation unit configured to generate the pair of image signals from outputs of the pixel lines of the focus detection areas; and a focus detection unit configured to determine an amount of defocus of an imaging optical system by using the pair of image signals generated by the signal generation unit, wherein the setting unit is configured to arrange the pixel lines such that the pixel lines are out of phase between adjacent focus detection areas.

According to the present invention it is possible to implement a focus detection technique with which a processing load can be reduced while a desired object capturing rate and a desired focus detection accuracy are achieved.

Further features of the present invention will become apparent from the following description of exemplary embodiments (with reference to the attached drawings).

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

In the present embodiment, an example will be described in which a focus detection apparatus according to the present invention is implemented by a digital camera having a phase difference detection automatic focus (AF) function, but the present invention is applicable to a focus detection apparatus incorporated in an electronic device such as a smart phone, which is a kind of mobile phone, or a tablet terminal.

Apparatus Configuration

A configuration of an image capturing apparatus equipped with a focus detection apparatus that implements an AF function according to the present embodiment will be described with reference to FIG. 1.

Figure 1:
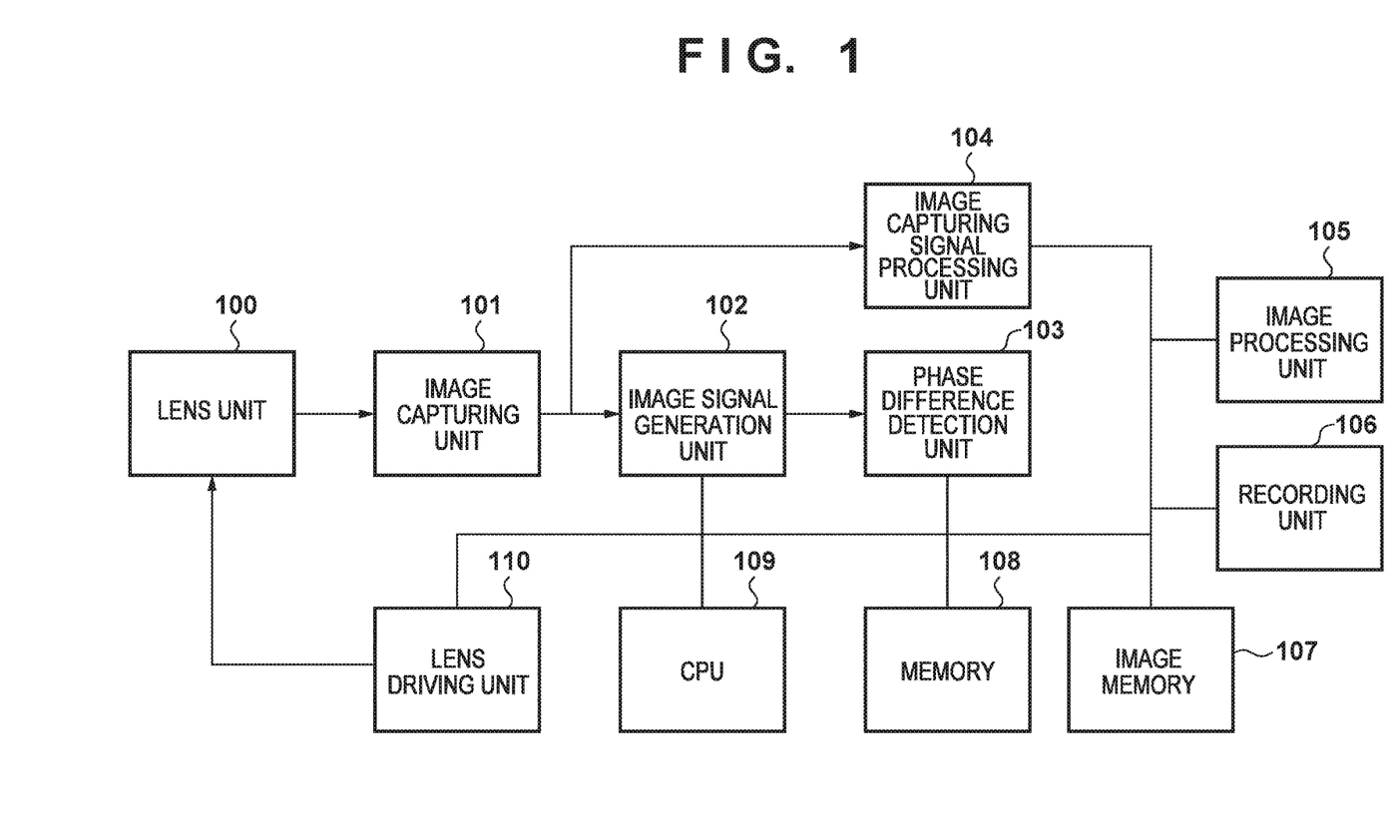
FIG. 1 is a block diagram showing a configuration of an apparatus according to an embodiment of the present invention.

In FIG. 1, a lens unit 100 includes a focusing lens, a zoom lens, a diaphragm, and the like, and constitutes an imaging optical system.

An image capturing unit 101 includes a photoelectric conversion element such as a CCD or CMOS, and converts an object image to an electric signal. The image capturing unit 101 includes unit pixels each having a photoelectric conversion unit divided into two (pupil divided) with respect to one microlens, and receives light beams that have passed through different pupil regions of an image forming optical system via the microlens.

An image signal generation unit 102 receives an output from the image capturing unit 101 and generates a pair of pupil-divided image signals.

A phase difference detection unit 103 performs correction processing for correcting optical distortion on each of the pair of image signals and correlation calculation for detecting a phase difference (the amount of defocus) of the pair of image signals.

An image capturing signal processing unit 104 generates an image capturing signal (image signal) obtained by adding the pair of image signals output from the image capturing unit 101. Also, the image capturing signal processing unit 104 performs a plurality of processing operations such as optical correction processing and electric noise processing on the image signal obtained through addition of the pair of image signal.

An image memory 107 is a volatile memory, such as a RAM, that temporarily stores the image signal generated by the image capturing signal processing unit 104.

An image processing unit 105 converts the image signal generated by the image capturing signal processing unit 104 into a file in a predetermined format such as moving image or still image.

A recording unit 106 records the image file generated by the image processing unit 105 in a recording medium. The recording medium functions as a ROM for storing programs and data processed by a CPU 109. The recording medium is, for example, a built-in or external hard disk drive or a memory card.

A memory 108 and the CPU 109 function as a control unit for controlling the overall operations of the apparatus. The CPU 109 controls the operations of the above-described units so as to implement the on-imaging surface phase difference AF according to the present embodiment. Specifically, the CPU 109 controls a lens driving unit 110, based on the amount of defocus determined by the phase difference detection unit 103, such that the lens unit 100 is in focus.

The memory 108 includes a RAM serving as a work memory for temporarily storing data necessary for the CPU 109 to perform processing in accordance with a control program or a program stored in the recording medium. The image memory 107 and the memory 108 may be configured as a single unit.

The lens driving unit 110 drives the focusing lens, the diaphragm, and the like of the lens unit 100 to be in a predetermined state in accordance with an instruction from the CPU 109.

Configuration of Image Capturing Unit

A pixel configuration of the image capturing unit 101 according to the present embodiment will be described next with reference to FIGS. 2A and 2B.

Figure 2A:
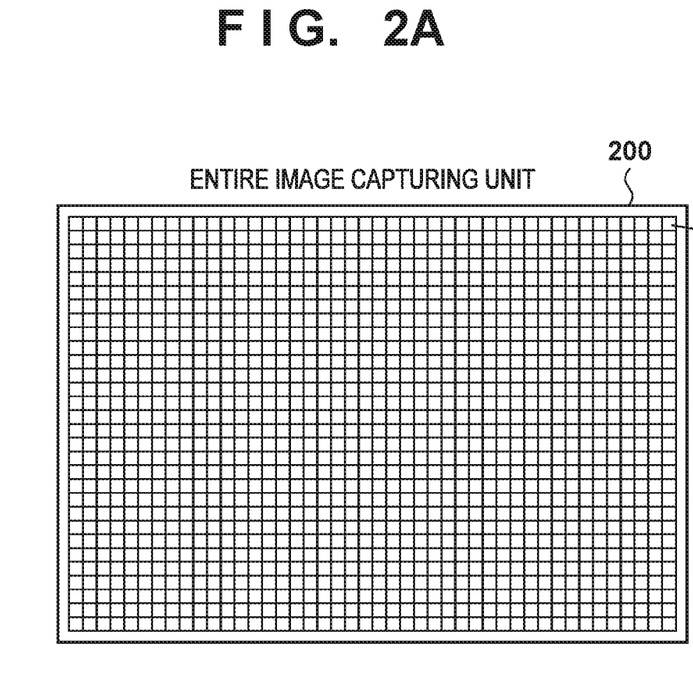
FIGS. 2A and 2B are diagrams showing a configuration of an image capturing unit according to the embodiment.
Figure 2B:
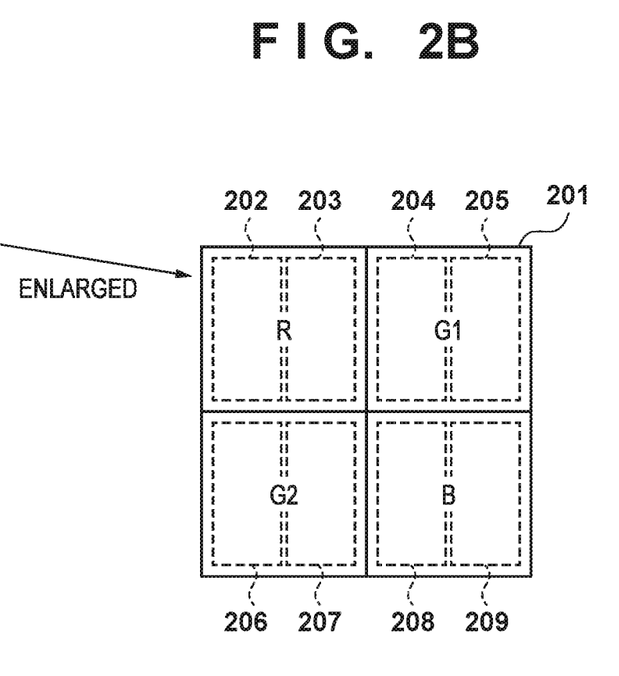

FIG. 2B is an enlarged view of a pixel block 201 composed of 2×2 pixels extracted from all pixels 200 of the image capturing unit 101 shown in FIG. 2A.

The pixels 200 of the image capturing unit 101 are arranged in a Bayer pattern, and each of RGB photoelectric conversion units (hereinafter, also referred to as "pixels") are divided into two so as to share one microlens. Here, a pair of image signals output from each of the RGB pixels that has been divided into two are referred to as an A image and a B image. For example, the R pixel outputs an A image 202 and a B image 203, the G1 pixel outputs an A image 204 and a B image 205, the G2 pixel outputs an A image 206 and a B image 207, and the G pixel outputs an A image 208 and a B image 209.

In the configuration in which each pixel is divided into two (pupil divided) as described above, one pixel signal is obtained by adding the A image and the B image. Also, the A image and the B image are used as phase difference detection signals for on-imaging surface phase difference AF by being separately processed.

When the A image and the B image that are output from the image capturing unit 101 are input into the image capturing signal processing unit 104, the A image and the B image are added as signals for recording a moving image or still image or as display signals, and one normal pixel signal is generated. As described above, the signal is subjected to optical correction processing, electric noise processing and the like performed by the image capturing signal processing unit 104. In the case where the image signal stored in the image memory 107 is recorded, for example, in a file, the image signal is converted to a predetermined format (moving image or still image such as MPEG2, MP4 or JPG) by the image processing unit 105 and recorded into a recording medium by the recording unit 106.

The image signal for the A image and the image signal for the B image output from the image capturing unit 101 to the image signal generation unit 102 are each subjected to addition/compression processing, which will be described later with reference to FIGS. 3A to 3D, according to a predetermined compression rate (the amount of addition) pre-set by the image signal generation unit 102.

Compression Processing

Next, image signal addition/compression processing performed by the image signal generation unit 102 according to the present embodiment will be described with reference to FIGS. 3A to 3D.

FIGS. 3A to 3D schematically show horizontal addition/compression processing among image signal addition/compression processing operations in two perpendicular directions.

Figure 3A:
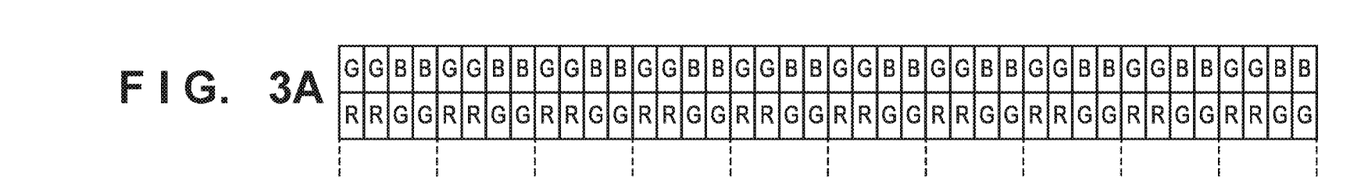
FIGS. 3A to 3D are diagrams illustrating a method for adding/compressing focus detection pixels in a horizontal direction.

FIG. 3A shows, as an example, two pixel lines (distance measurement lines) extending in the horizontal direction. In the case of generating two images, namely, an A image and a B image, to perform phase difference detection, the images are generated by using the Bayer pattern as a basic unit. In other words, in the example shown in FIGS. 2A and 2B, the images A 202, 204, 206 and 208 that are output from the RGB pixels are added and averaged to generate one pixel's worth of image signal for the A image. Likewise, the B images 203, 205, 207 and 209 are added and averaged to generate one pixel's worth of image signal for the B image. By setting the pixel compression rate (the amount of addition) as appropriate, which will be described later, by using one pixel converted into a luminance signal as described above as a minimum unit, the pixel lines within a predetermined AF frame are set.

Figure 3B:
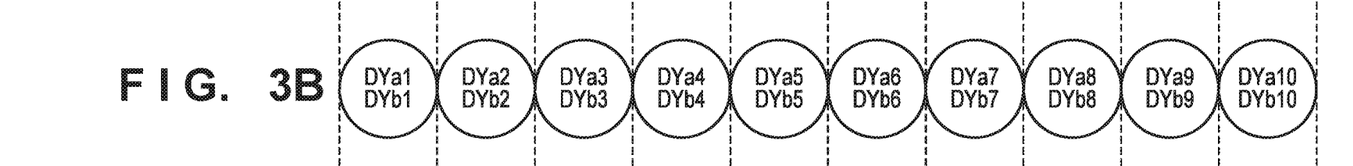

FIG. 3B shows, as an example, image signals in the case where the addition/compression processing has been performed on each Bayer unit serving as a minimum unit. DYa1 to DYa10 indicate signals of the A images, and DYb1 to DYb10 indicate signals of the B images. It can be said that they are approximately minimum units as image signals for phase difference detection and thus provide the highest detection accuracy. However, addition/compression processing as shown in FIG. 3C or 3D may be performed according to the processing ability of a circuit in a subsequent stage after the phase difference detection unit 103.

Figure 3C:
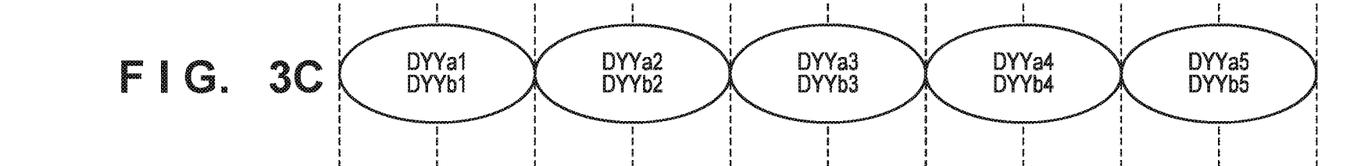

FIG. 3C shows, as an example, image signals in the case where the addition/compression processing has been performed every two Bayer units. In this case, DYa1 and DYa2 are added and averaged to generate DYYa1 as one pixel's worth of image signal for the A image, and the processing is performed in the same manner to generate DYYa2, DYYa3, DYYa4 and DYYa5. With respect to the B image, the image signals at the same position are added and averaged in the same manner to generate DYYb1, DYYb2, DYYb3, DYYb4 and DYYb5 as one pixel's worth of image signal for the B image.

Figure 3D:
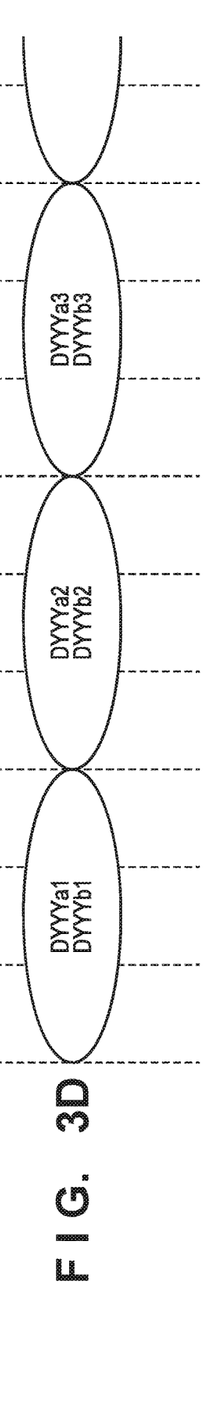

FIG. 3D shows, as an example, image signals in the case where the addition/compression processing has been performed every three Bayer units. In this case, by adding and averaging DYa1, DYa2 and DYa3, DYYYa1 is generated as one pixel's worth of image signal for the A image. The processing is performed in the same manner to generate image signals for B image.

The addition/compression processing is performed by using any one of the compression rates (the amounts of addition) shown in FIGS. 3B to 3D described above, and phase difference detection processing of the on-imaging surface phase difference AF is performed by using the obtained image signals. Then, highly accurate focus detection processing can be performed by using a low compression rate (the amount of addition) as shown in FIG. 3B according to the processing ability and the content of processing of a circuit in a subsequent stage after the phase difference detection unit 103, whereas in the case where the circuit in the subsequent stage has a high processing load or a desired accuracy is satisfied, the addition/compression processing as shown in FIG. 3C or 3D may be performed to reduce the processing load of the circuit in the subsequent stage.

Figure 4:
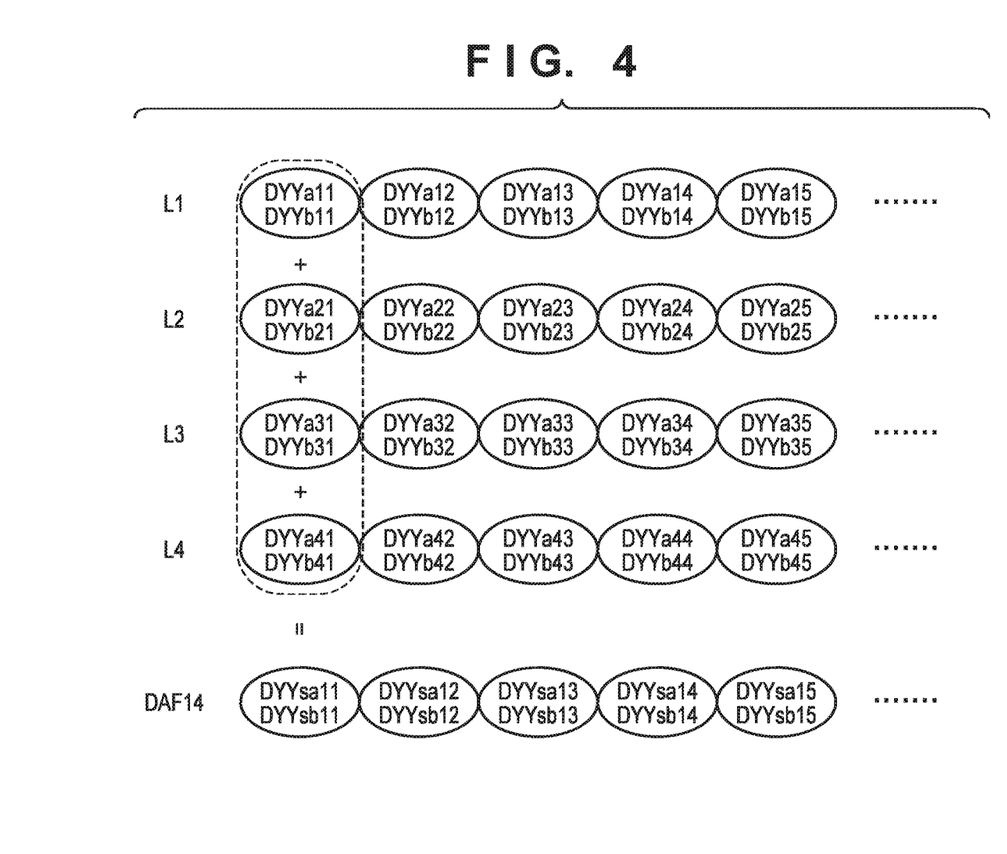
FIG. 4 is a diagram illustrating a method for adding/compressing focus detection pixels in a vertical direction.

FIG. 4 schematically shows vertical addition/compression processing among image signal addition/compression processing operations in two perpendicular directions.

In the following description, image signals that have undergone the horizontal addition/compression processing performed every two Bayer units as shown in FIG. 3C are indicated by DYYamn (A image in line m and column n) and DYYbmn (B image in line m and column n). In FIG. 4, a total of four pixel lines L1 to L4 are shown, with L1 indicating the first pixel line. FIG. 4 shows, as an example, a case where four pixel lines are added/compressed in the vertical direction, and by adding and averaging DYYa11, DYYa21, DYYa31 and DYYa41, DYYsa11 is generated as one pixel's worth of image signal for the A image. The same applies to the B image, and by adding and averaging DYYb11, DYYb21, DYYb31 and DYYb41, DYYsb11 is generated as one pixel's worth of image signal for the B image. By performing the vertical addition/compression processing described above sequentially in the horizontal direction, image signals for the A image and the B image that have been added/compressed in the vertical direction such as DYYsa/b11 to DYYsa/bmn are generated.

Figure 5:
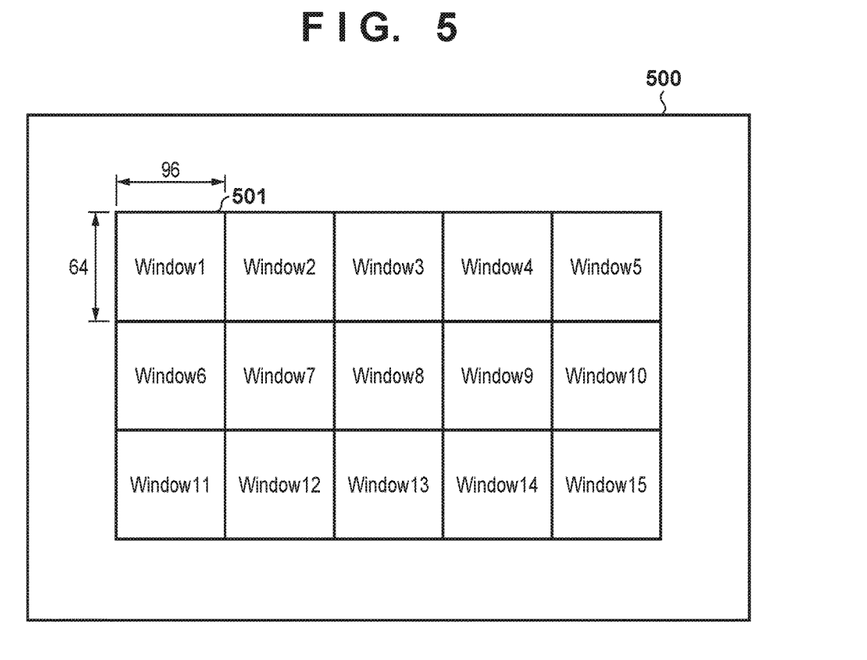
FIG. 5 is a diagram showing an angle of view and AF frames.

FIG. 5 shows focus detection areas (AF frames) for on-imaging surface phase difference AF set by an automatic focus application of the camera, with respect to the entirety of an angle of view 500 of the camera, and the AF frames are indicated by Window 1 (501) to Window 15. In this example, AF frames indicated by Window 1 to Window 15 are two-dimensionally arranged, with five frames in the horizontal direction and three frames in the vertical direction. In each frame, there are 96 images A and 96 images B that have undergone addition/compression processing at a predetermined compression rate (the amount of addition) in the horizontal direction, and there are pixels corresponding to 64 lines in the vertical direction.

A method for adding/compressing the pixel lines in the vertical direction performed when phase difference detection is performed on one frame indicated by 501 will now be described with reference to FIGS. 6A to 6D.

Figure 6A:
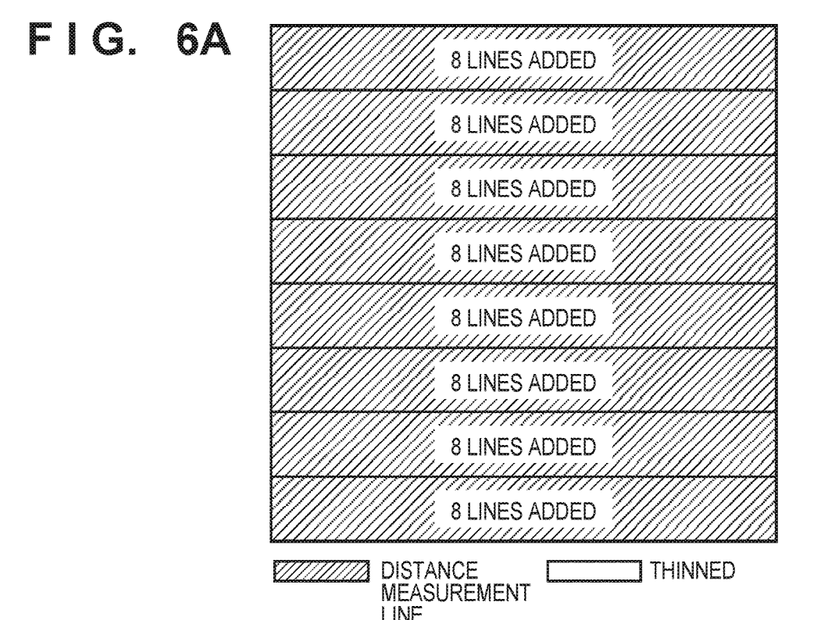
FIGS. 6A to 6D are diagrams showing patterns of pixel lines within one frame.
Figure 6B:
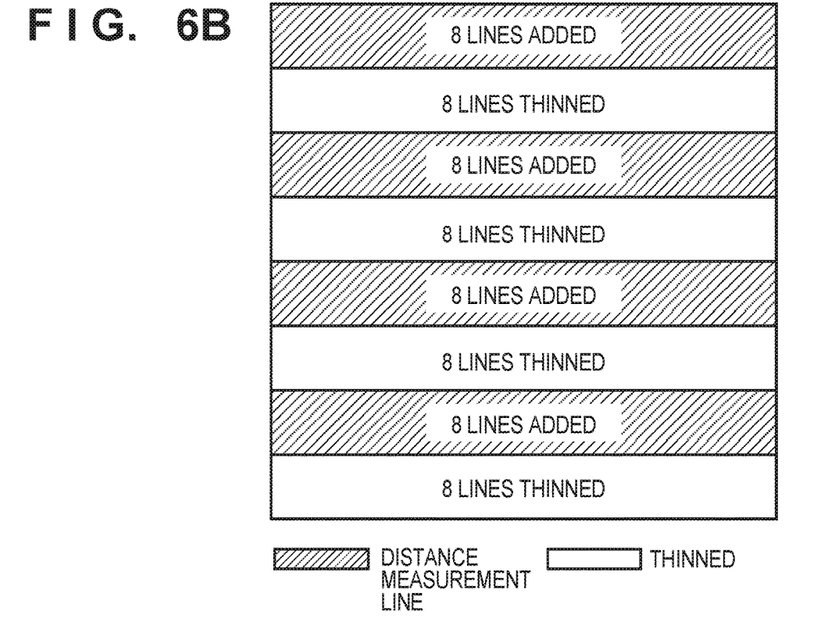
Figure 6C:
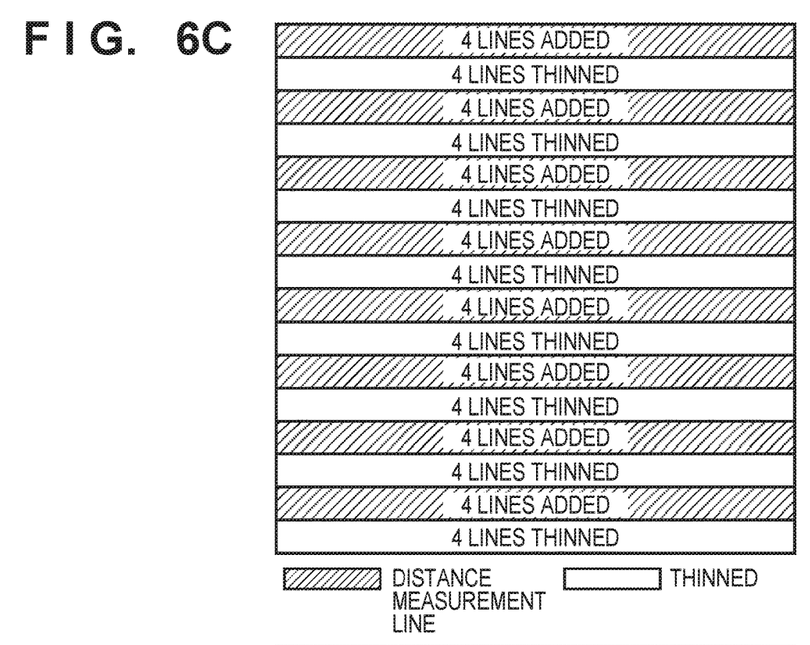
Figure 6D:
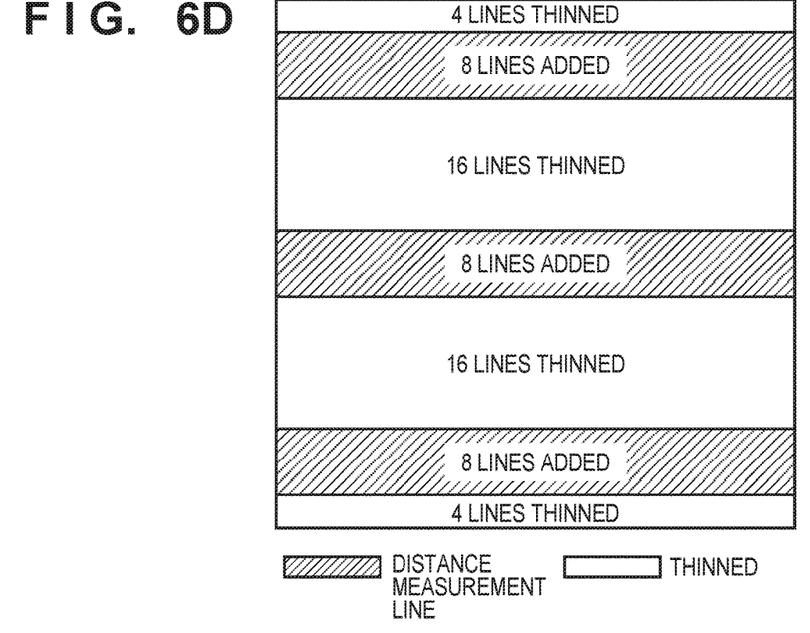

FIG. 6A shows, as a first method, an example in which eight bundles generated by adding and averaging image signals of every eight lines are arranged as pixel lines. The eight bundles correspond to one frame indicated by 501 in FIG. 5. FIG. 6B shows, as a second method, an example in which four addition bundles each generated by adding eight lines and four thinning bundles each generated by thinning eight lines are alternately arranged. FIG. 6C shows, as a third method, an example in which eight addition bundles each generated by adding four lines and eight thinning bundles each generated by thinning four lines are alternately arranged. FIG. 6D shows, as a fourth method, an example in which thinning bundles each generated by thinning four lines are arranged respectively on top and bottom, and three addition bundles each generated by adding eight lines and two thinning bundles each generated by thinning sixteen lines are alternately arranged.

There are many other methods other than the first to fourth methods described above, but what is important is that the circuit processing time depends on the number of bundles of pixel lines arranged. In the on-imaging surface phase difference AF, various processing operations such as filter processing and correlation calculation processing are performed on each pixel line. Accordingly, the calculation time required for one frame is approximately proportional to the number of pixel lines within one frame. The following relationship is established: Ta=Tc>Tb>Td, where the processing times required for the line patterns shown in FIGS. 6A to 6D are indicated by Ta, Tb, Tc and Td, respectively. When the processing time required for one frame satisfies the above relationship, the processing time required for all AF frames equals N times the processing time required for one frame, where the number of frames is represented by N, such as N×Ta, . . . and so on. The number of frames is determined depending on the AF operation conditions such as, for example, the number of frames being 15 as shown in FIG. 5, the number of frames being a total of nine frames in 3×3, or the number of frames being one. If there is a large difference in the processing time (detection time) due to the number of frames, control for driving the focusing lens in the AF operation becomes complex. Accordingly, it is desirable to use a configuration in which, in the case where there are a large number of frames, the processing time required for one frame is shortened to reduce the processing time for all frames, whereas, on the other hand, in the case where there are a small number of frames, highly accurate calculation is performed by bringing the processing time for all frames closer to that when the number of frames is large, so as to set the processing time to be as identical as possible.

Based on the concept described above, in the case of an AF operation in which the number of frames is increased to find an object, the number of pixel lines within one frame is reduced to a certain extent by thinning, and after an object of interest has been identified, the number of frames is reduced to increase the density of pixel lines within one frame (the number of lines within one frame) and increase the detection accuracy, and thereby an optimal system in which the balance of processing load is taken into account can be obtained.

AF Frame Setting Processing

A method for setting AF frames when the CPU 109 according to the present embodiment, as a setting unit according to the present invention, performs on-imaging surface phase difference AF will now be described with reference to FIGS. 7 to 10B.

Figure 7:
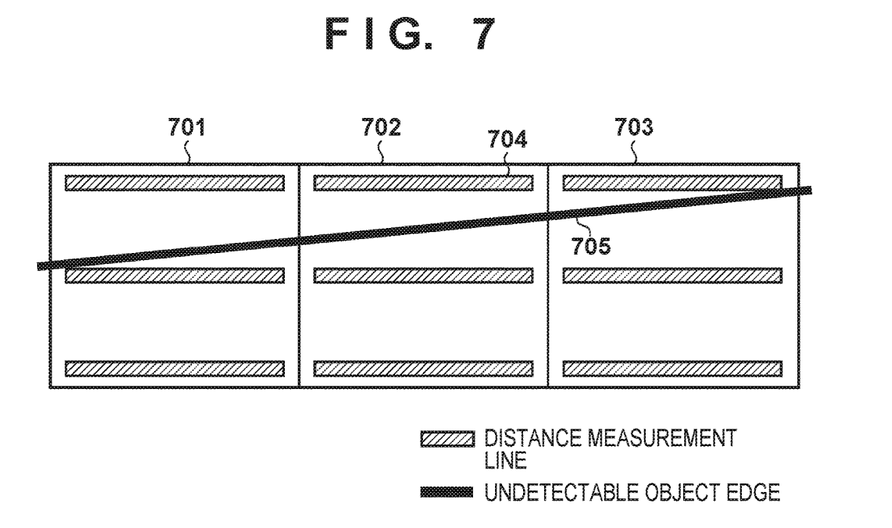
FIG. 7 is a diagram showing a layout of pixel lines between adjacent frames.
Figure 8:
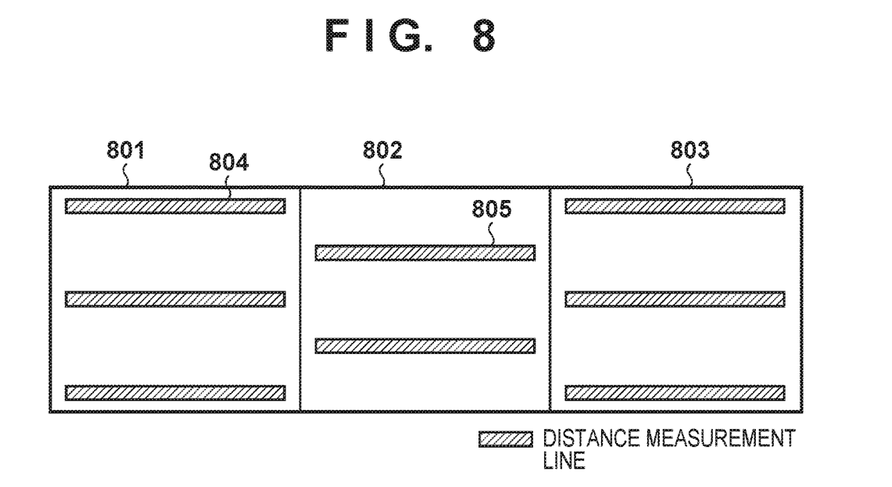
FIG. 8 is a diagram showing a layout of pixel lines between adjacent frames.
Figure 9:
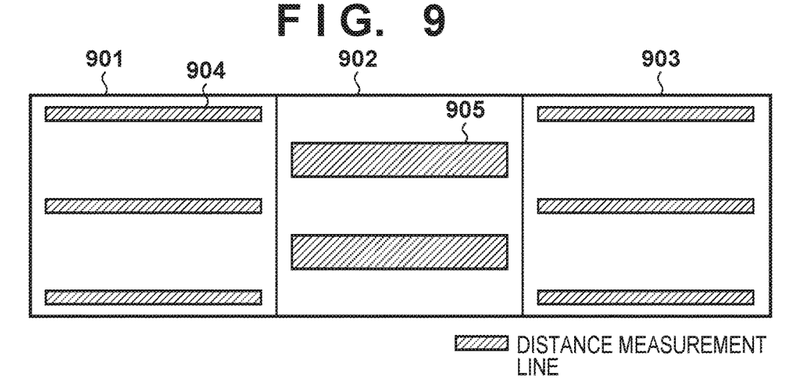
FIG. 9 is a diagram showing a layout of pixel lines between adjacent frames.

Reference numerals 701 to 703 shown in FIG. 7 illustrated for comparison purpose each indicate one frame for which on-imaging surface phase difference AF is performed, and correspond to three frames that are adjacent in the horizontal direction extracted from the fifteen frames shown in FIG. 5. In one of the frames, pixel lines 704 are set as shown in the line pattern shown in FIG. 6D. This example shows a state in which an object edge indicated by 705 is not captured. In an AF operation in which the number of frames is increased to roughly search for an object, it is important to improve the object capturing rate, and for this purpose, the layout of pixel lines within each frame is changed to that shown in FIG. 8. In FIG. 8 as well, 801 to 803 each indicate one frame for which on-imaging surface phase difference AF is performed, and the layout is set such that pixel lines 804 of a frame 801 and pixel lines 805 of a frame 802 adjacent to the frame 801 are arranged so as to be out of phase. It is thereby possible to, as compared with the pixel lines shown in FIG. 7, improve the capturing rate for the diagonal line without changing the capturing rate for the vertical lines. Likewise, in FIG. 9 showing another embodiment, 901 to 903 each indicate one frame for which on-imaging surface phase difference AF is performed, and the layout is set such that pixel lines 904 of a frame 901 and pixel lines 905 of a frame 902 adjacent to the frame 901 are arranged so as to be out of phase and increase the compression rate (the number of additions) of the pixel lines 905 of the frame 902 relative to that of the pixel lines of adjacent frames 901 and 903. With the layout of pixel lines shown in FIG. 9, the object capturing rate for the diagonal line is further improved as compared with the layout shown in FIG. 8.

Figure 10A:
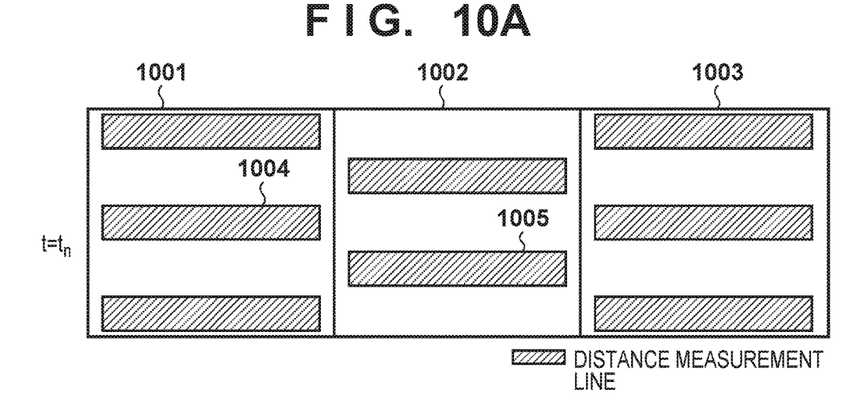
FIGS. 10A and 10B are diagrams each showing a layout of pixel lines between adjacent frames.
Figure 10B:
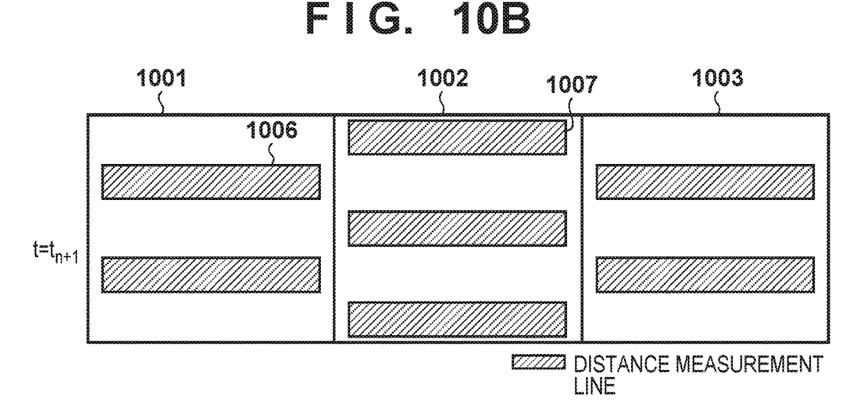

Furthermore, another embodiment is shown in FIGS. 10A and 10B, with FIG. 10A showing, as an example, a layout of pixel lines at time tn. Reference numerals 1001 to 1003 shown in FIGS. 10A and 10B each indicate one frame for which on-imaging surface phase difference AF is performed, and the layout is set such that pixel lines 1004 of a frame 1001 and pixel lines 1005 of a frame 1002 adjacent to the frame 1001 are arranged so as to be out of phase. Also, the compression rate (the number of additions) of the pixel lines is increased relative to that of the pixel lines shown in FIG. 8.

FIG. 10B shows, as an example, a layout of pixel lines at time $t_{n+1}$. Contrary to the layout at time tn shown in FIG. 10A, the layout is set such that the pixel lines of the frames 1001 and 1003 are arranged in the same manner as the pixel lines of the adjacent frame 1002 at time tn, and the pixel lines of the frame 1002 are arranged in the same manner as the pixel lines of the frame 1001 at time tn. Thereafter, at time $t_{n+2}$, the layout is set back to that shown in FIG. 10A. In this way, the layout of pixel lines is alternately switched in time series (for example, for each moving image frame). By doing so, the object capturing rate for a stationary object can be further improved as compared with the layout shown in FIG. 9.

Figure 11:
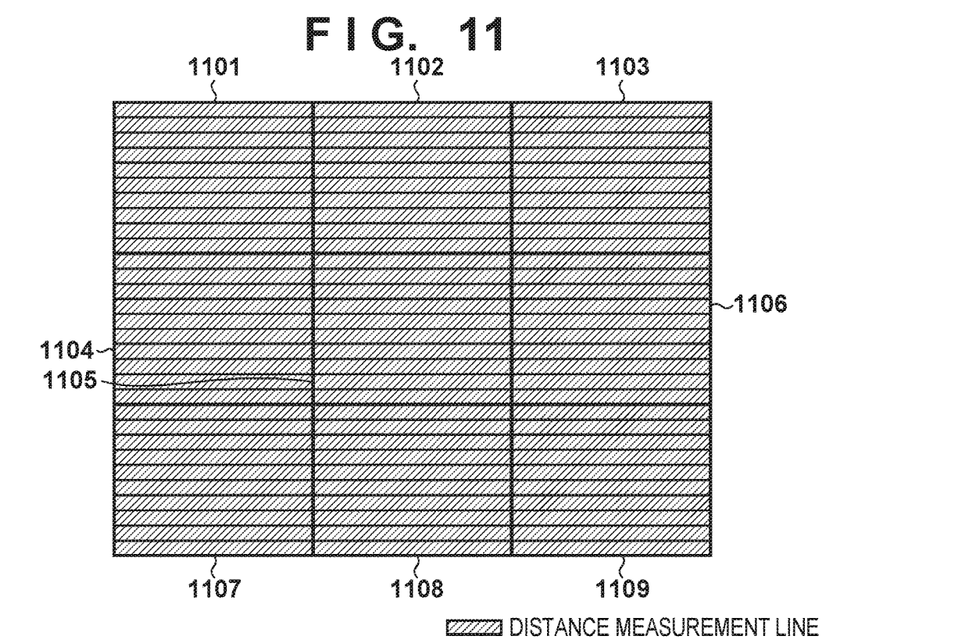
FIG. 11 is a diagram showing a layout of pixel lines between adjacent frames.
Figure 12:
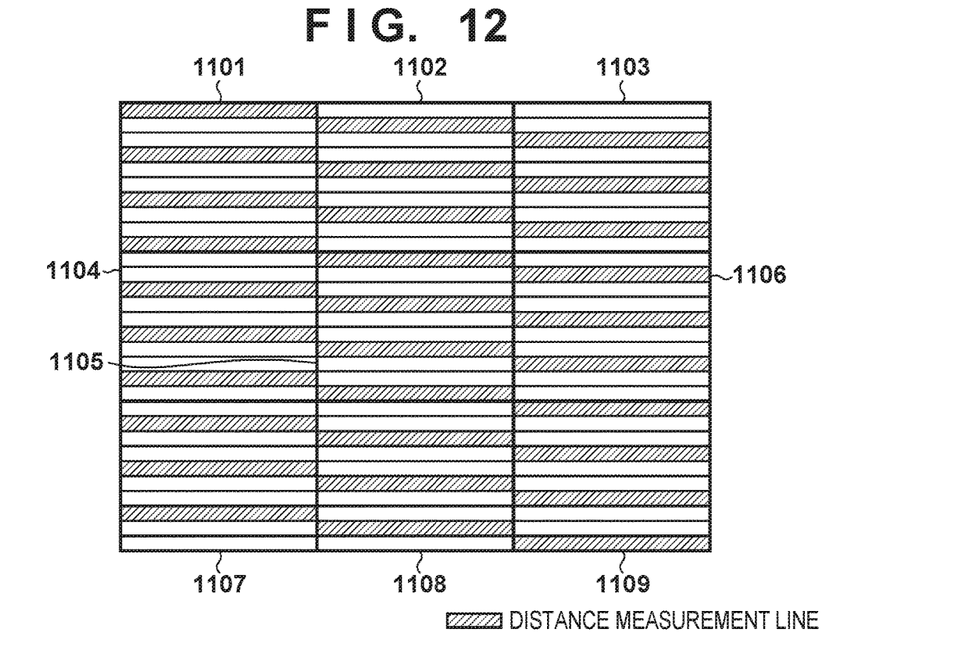
FIG. 12 is a diagram showing a layout of pixel lines between adjacent frames.

Another embodiment is shown in FIGS. 11 and 12. In FIG. 11 illustrated for comparison purpose, 1101 to 1109 each indicate one frame for which on-imaging surface phase difference AF is performed, and correspond to a total of nine frames in 3×3 that are adjacent in the horizontal and vertical directions, extracted from the frames. In FIG. 11, each frame includes ten pixel lines that have undergone predetermined addition/compression processing, and the frame is 100 percent filled with the pixel lines, without any pixel line being thinned.

In FIG. 12 showing a configuration according to the present embodiment, thinning processing for thinning pixel lines has been performed for each frame on the configuration shown in FIG. 11. In FIG. 12, the layout is set such that the pixel lines of frames 1101, 1102 and 1103 that are adjacent in the horizontal direction are arranged so as to be out of phase, and a total sum of horizontal pixel lines of the three frames corresponds to the total number of pixel lines within one frame. The layout of pixel lines is repeatedly changed every three frames as described above until all frames are processed.

According to the embodiments described above, it is possible to implement on-imaging surface phase difference AF in which the number of frames is increased until an object of interest is identified so as to increase the object capturing rate and after an object has been identified, the number of frames is reduced to increase the density (the number of lines within one frame).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-080350, filed Apr. 9, 2015, which is hereby incorporated by reference herein in its entirety.

What is claimed is:

1. A focus detection apparatus comprising:
   an image capturing unit including a plurality of pixels for detecting a pair of image signals of an object from light beams that have passed through different pupil regions of an image forming optical system; and
   at least one processor or circuitry, which functions as:
      a setting unit configured to set focus detection areas in which a plurality of pixels of the image capturing unit are aligned in a first direction and a second direction to form pixel lines along the first direction and the second direction, respectively,
      a signal generation unit configured to generate the pair of image signals from outputs of distance measurement lines in each of the set focus detection areas, and
      a focus detection unit configured to determine an amount of defocus of an imaging optical system by using the pair of image signals generated by the signal generation unit,
   wherein of the set focus detection areas, for first and second set focus detection areas which are adjacent to each other in the first direction, the distance measurement lines in the second set focus detection area are arranged in different pixel lines in the second direction with respect to the pixel lines in which the distance measurement lines in the first set focus detection area are arranged.

2. The apparatus according to claim 1, wherein the signal generation unit includes:
   a first signal generation unit configured to generate an image signal obtained by adding outputs of pixel lines in the first direction for each of the focus detection areas; and
   a second signal generation unit configured to generate an image signal obtained by adding outputs of pixel lines in the second direction for each of the focus detection areas.

3. The apparatus according to claim 2, wherein the signal generation unit includes a thinning processing unit configured to thin the pixel lines of the focus detection areas in the second direction.

4. The apparatus according to claim 3, wherein the setting unit is configured to alternately arrange pixel lines generated by the signal generation unit adding predetermined pixel lines of the focus detection areas and pixel lines generated by the signal generation unit thinning predetermined pixel lines.

5. The apparatus according to claim 4, wherein the setting unit is configured to arrange pixel lines having different number of additions performed by the signal generation unit between adjacent focus detection areas.

6. The apparatus according to claim 3, wherein the setting unit is configured to set a total sum of the pixel lines of the adjacent focus detection areas so as to correspond to a total number of pixel lines of one focus detection area.

7. The apparatus according to claim 1, wherein the setting unit is configured to alternately switch an arrangement of the pixel lines of the adjacent focus detection areas on a time interval.

8. A control method of a focus detection apparatus which has an image capturing unit including a plurality of pixels for detecting a pair of image signals of an object from light beams that have passed through different pupil regions of an image forming optical system and performs focus detection by using the image capturing unit, the method comprising:
   setting focus detection areas in which a plurality of pixels of the image capturing unit are aligned in a first direction and a second direction to form pixel lines along the first direction and the second direction, respectively;

generating the pair of image signals from outputs of distance measurement lines in each of the set focus detection areas; and determining an amount of defocus of an imaging optical system by using the generated pair of image signals, wherein of the set focus detection areas, for first and second set focus detection areas which are adjacent to each other in the first direction, the distance measurement lines in the second set focus detection area are arranged in different pixel lines in the second direction with respect to the pixel lines in which the distance measurement lines in the first set focus detection area are arranged.

9. An image capturing apparatus comprising:

a control unit configured to perform control based on an amount of defocus of a lens unit such that the lens unit is in focus, wherein the control unit includes a focus detection apparatus, the focus detection apparatus comprising:

an image capturing unit including a plurality of pixels for detecting a pair of image signals of an object from light beams that have passed through different pupil regions of an image forming optical system; and at least one processor or circuitry, which functions as:

a setting unit configured to set focus detection areas in which a plurality of pixels of the image capturing unit are aligned in a first direction and a second direction to form pixel lines along the first direction and the second direction, respectively, a signal generation unit configured to generate the pair of image signals from outputs of distance measurement lines set in each of the focus detection areas, and a focus detection unit configured to determine an amount of defocus of an imaging optical system by using the pair of image signals generated by the signal generation unit, wherein of the set focus detection areas, for first and second set focus detection areas which are adjacent to each other in the first direction, the distance measurement lines in the second set focus detection area are arranged in different pixel lines in the second direction with respect to the pixel lines in which the distance measurement lines in the first set focus detection area are arranged.

10. A non-transitory computer-readable storage medium storing a program for causing a computer to function as a focus detection apparatus, the focus detection apparatus comprising:

an image capturing unit including a plurality of pixels for detecting a pair of image signals of an object from light beams that have passed through different pupil regions of an image forming optical system; and at least one processor or circuitry, which functions as:

a setting unit configured to set focus detection areas in which a plurality of pixels of the image capturing unit are aligned in a first direction and a second direction to form pixel lines along the first direction and the second direction, respectively;

a signal generation unit configured to generate the pair of image signals from outputs of distance measurement lines set in each of the focus detection areas; and a focus detection unit configured to determine an amount of defocus of an imaging optical system by using the pair of image signals generated by the signal generation unit, wherein of the set focus detection areas, for first and second set focus detection areas which are adjacent to each other in the first direction, the distance measurement lines in the second set focus detection area are arranged in different pixel lines in the second direction with respect to the pixel lines in which the distance measurement lines in the first set focus detection area are arranged.

11. The apparatus according to claim 3, wherein each of the focus detection areas is an area in which the distance measurement line and a thinned line including the plurality of pixels aligned in the first direction are arranged in the second direction, and the thinning processing unit is configured to thin the thinned line.

12. The apparatus according to claim 11, wherein the distance measurement line arranged in one of the focus detection areas and the thinned line arranged in another one of the focus detection areas are arranged in one pixel line of the image capturing unit.

* * * * *